US008879144B2

(12) United States Patent
Lin et al.

(10) Patent No.: US 8,879,144 B2
(45) Date of Patent: Nov. 4, 2014

(54) DRIVING SUBSTRATE AND DISPLAY USING THE SAME

(71) Applicant: E Ink Holdings Inc., Hsinchu (TW)

(72) Inventors: Chin-Wei Lin, Hsinchu (TW); Po-Hsin Lin, Hsinchu (TW); Chi-Liang Wu, Hsinchu (TW); Ted-Hong Shinn, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 13/716,199

(22) Filed: Dec. 16, 2012

(65) Prior Publication Data

US 2013/0242376 A1  Sep. 19, 2013

(30) Foreign Application Priority Data

Mar. 15, 2012  (TW) .............................. 101108888 A

(51) Int. Cl.
  *G02B 26/00*  (2006.01)
  *G09G 3/30*  (2006.01)
  *G02F 1/167*  (2006.01)

(52) U.S. Cl.
  CPC ........ *G02F 1/167* (2013.01); *G02F 2001/1676* (2013.01)
  USPC ............................................. 359/296; 345/80

(58) Field of Classification Search
  CPC ....... G02F 1/0316; G02F 1/155; G02F 1/167; G02B 26/026; G09G 3/38
  USPC .......... 359/245, 265–275, 296; 345/107, 105, 345/80, 204–206
  See application file for complete search history.

(56) References Cited

U.S. PATENT DOCUMENTS 7,227,525 B2 * 6/2007 Kishi ............................ 345/107

* cited by examiner

*Primary Examiner* — Tuyen Tra
(74) *Attorney, Agent, or Firm* — CKC & Partners Co., Ltd.

(57) ABSTRACT

A driving substrate is disclosed. The driving substrate includes a first substrate. The first substrate has a display zone and a border zone surrounding the display zone. The border zone includes at least one active area and at least one non-active area. The active area includes a first conductive layer disposed on the first substrate. The non-active area connects the active area to form the border zone. A display using the driving substrate is also disclosed.

11 Claims, 7 Drawing Sheets

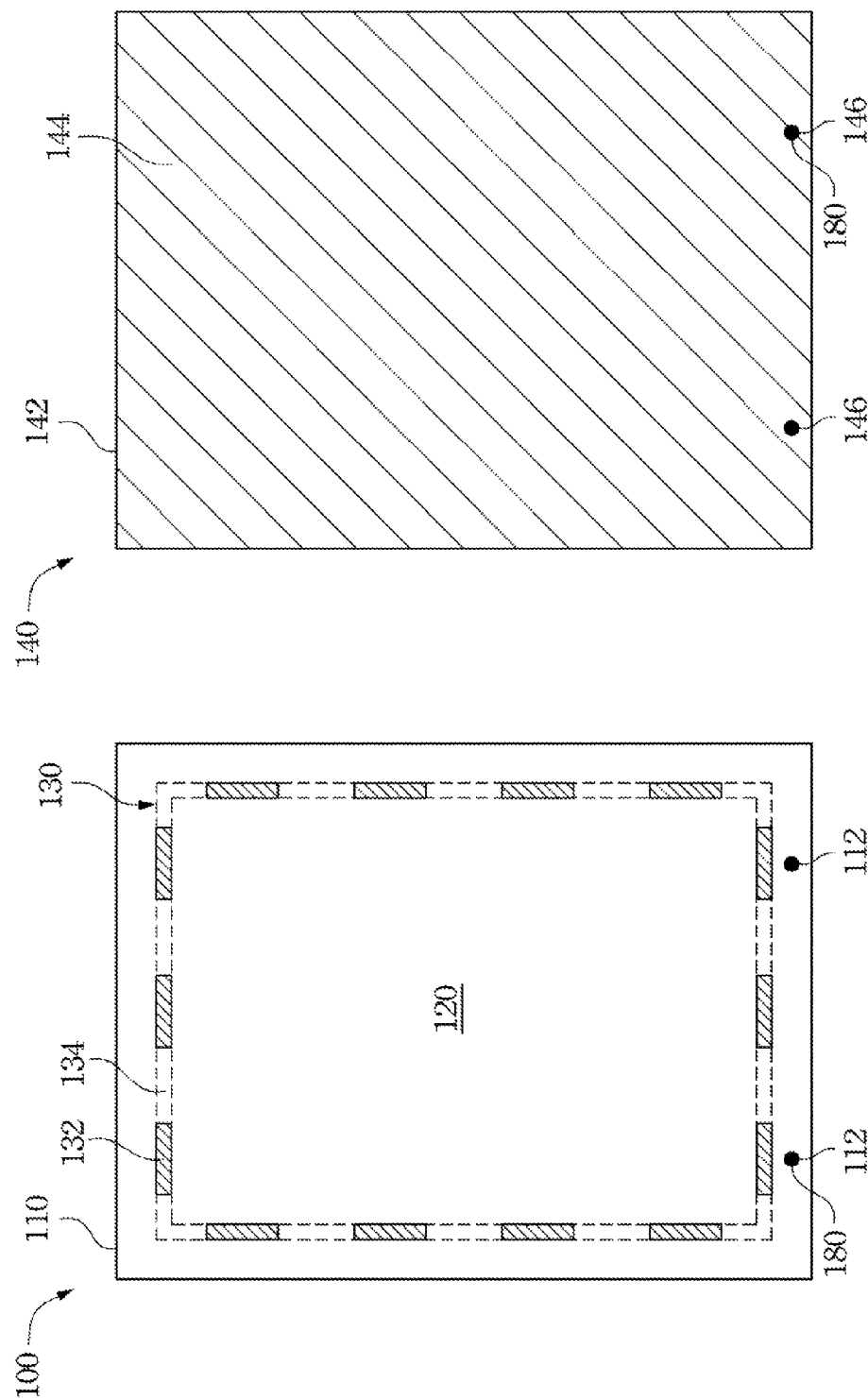

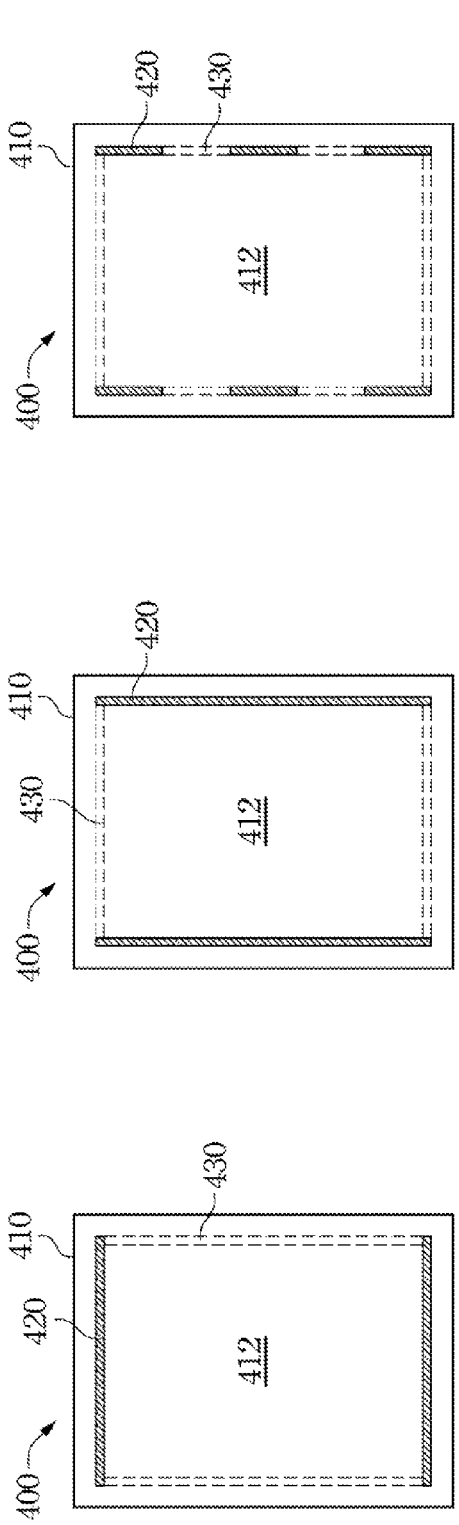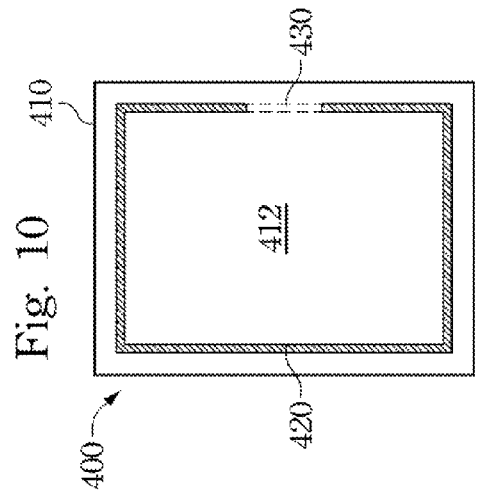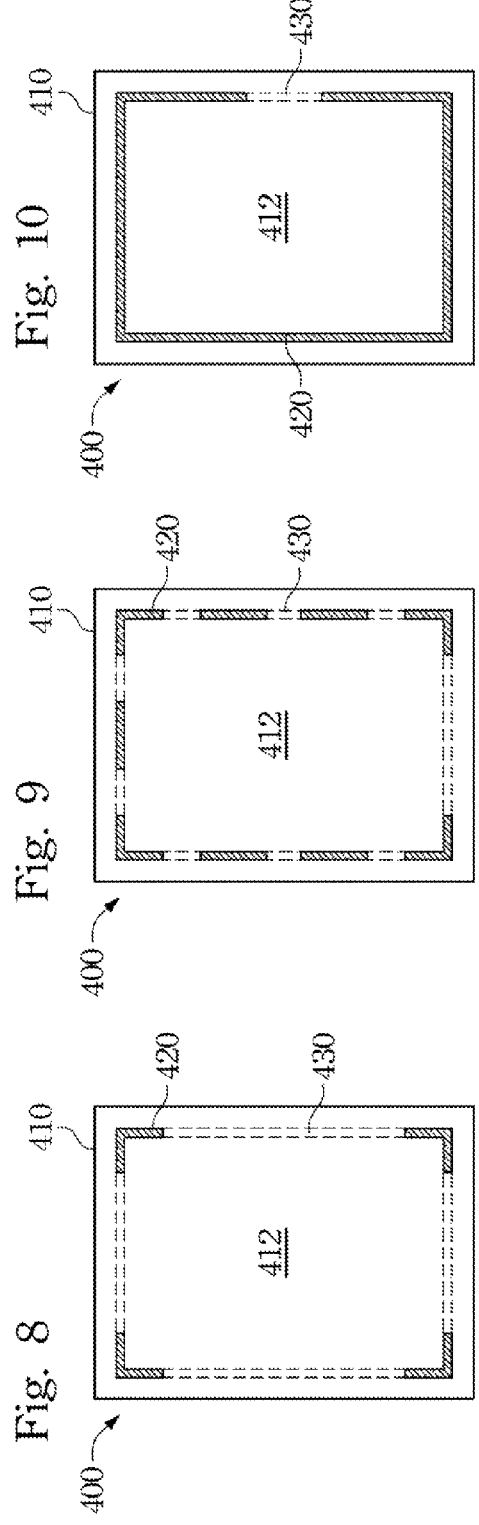

DRIVING SUBSTRATE AND DISPLAY USING THE SAME

RELATED APPLICATIONS

This application claims priority to Taiwan Application Serial Number 101108888 filed Mar. 15, 2012, which is herein incorporated by reference.

BACKGROUND

1. Field of Invention

The present invention relates to a display. More particularly, the present invention relates to an electronic paper display.

2. Description of Related Art

The electronic paper display (EPD) possesses the advantages of high contrast (the same as that of regular paper) and low power consumption, and is light and flexible. Users of electronic paper displays not only enjoy an experience as if they are reading a book, but also have the ability to update data at the same time.

The electronic paper display was first developed in the 1970s. Such a first-generation EDP comprises many small charged balls that are white on one side and black on the other side. The balls rotate to show different colors under a varied electric field. Second-generation electronic paper displays were developed in the 1990s. In a second-generation EDP, microcapsules filled with colored oil and charged white particles replace the small charged balls. An external electric field controls the movement of the white particles. The display shows a white color when the white particles move upward (toward the user), while it shows the color of the oil when the white particles move downward (away from the user).

The electronic paper display comprises two glass substrates. There are two conductive layers coated on these two glass substrates respectively as top and bottom electrodes for changing the color displayed via the movement of the charged particles when power is applied. In order to enable smooth packaging of the display, the display borders on the bottom glass substrate are typically marked to facilitate positioning. However, since the materials of the conductive layers (for example, Indium Tin Oxide, ITO) are mostly transparent, an oxidation-reduction reaction easily occurs on the parts of the conductive layer on the top glass substrate corresponding in location to the borders when the EDP is operated under high-temperature conditions or for long periods. Therefore, the impedance of the electrode becomes extremely high. Moreover, border-shaped insulating bands are formed, resulting in abnormal display since voltage is unable to enter into a display zone.

SUMMARY

An aspect of the invention provides a driving substrate. The driving substrate comprises a driving substrate. The driving substrate further comprises a first substrate, which comprises a display zone and a border zone surrounding the display zone. There are at least one active area and at least one non-active area in the border zone. The active area comprises a first conductive layer disposed on the first substrate, and the non-active area is connected to the least one active area for forming the border zone. In one embodiment, the least one non-active area is a through hole. In one embodiment, the least one non-active area comprises a second conductive layer and a first insulating layer. The second conductive layer is disposed on the first substrate and connected to the first conductive layer, and the first insulating layer is disposed on the second conductive layer. The at least one active area further comprises a second insulating layer and a third conductive layer. The second insulating layer is disposed on part of the first conductive layer, and the third conductive layer covers the second insulating layer and is connected to the first conductive layer.

In one embodiment, the number of the least one active layer or the least one non-active layer is one. In one embodiment, the number of the least one active layer or the least one non-active layer is plural, and the active areas and the non-active areas are arranged alternatingly.

An aspect of the invention further provides a display comprising the driving substrate mentioned above, a second substrate and a display layer, in which the display layer is disposed between the driving substrate and the second substrate. The second substrate comprises a transparent substrate and a transparent conductive layer disposed between the transparent substrate and the display layer.

BRIEF DESCRIPTION OF THE DRAWINGS

The invention can be more fully understood by reading the following detailed description of the embodiment, with reference made to the accompanying drawings as follows:

FIG. 4 and FIG. 5 are schematic diagrams of the driving substrate and a second substrate in FIG. 3, respectively;

FIG. 8 to FIG. 13 are schematic diagrams of active area and non-active area distributions of a driving substrate according to different embodiments in the invention.

DETAILED DESCRIPTION

Figure 1:
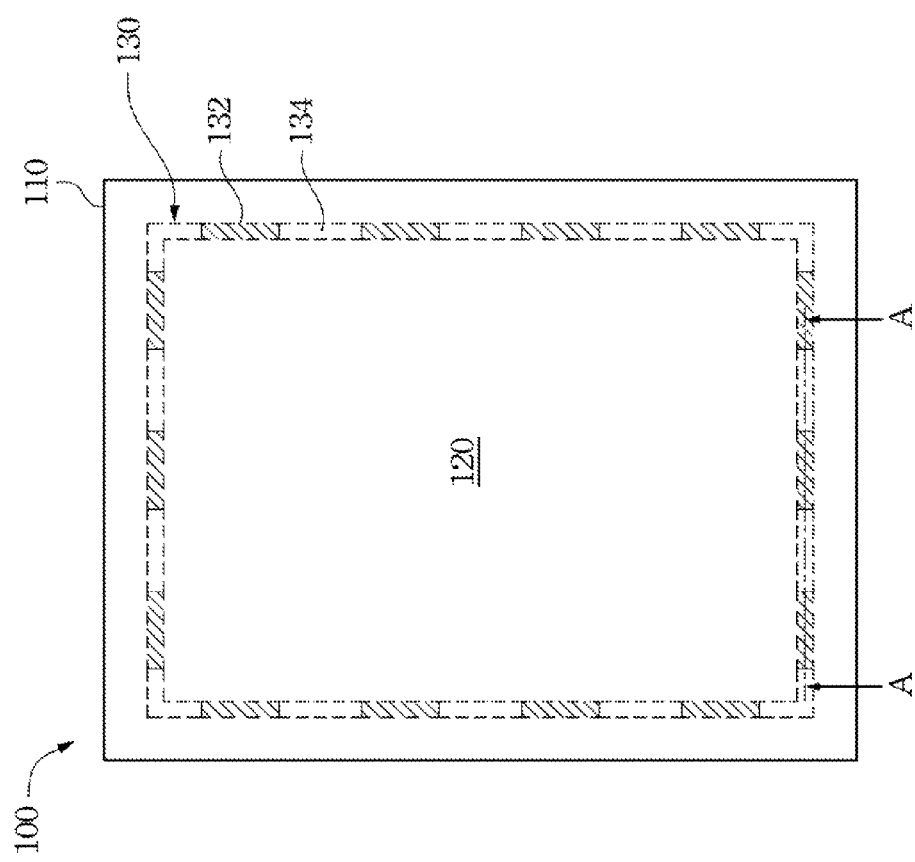
FIG. 1 is a top view of a driving substrate according to one embodiment in the invention.

Reference will now be made in detail to the present embodiments of the invention, examples of which are illustrated in the accompanying drawings. Wherever possible, the same reference numbers are used in the drawings and the description to refer to the same or like parts.

The present invention provides a driving substrate possessing a border zone with discontinuous patterns to enable the supply of power via through holes in border-shaped insulating bands. Through such a configuration, the problem of abnormal display caused by an inability of power to enter a display region due to high impedance formed by border-shaped insulating bands.

FIG. 1 is a top view of a driving substrate 100 according to one embodiment in the invention. The driving substrate 100 comprises a first substrate 110, which comprises a display zone 120 and a border zone 130 surrounding the display zone 120. The border zone 130 is a discontinuous pattern, and comprises at least one active area 132 and at least one non-active area 134. The non-active area 134 is connected to the active area 132 to form the border zone 130. In this embodiment, there are a plurality of the active areas 132 and the non-active areas 134, and the active areas 132 and the non-active 134 are arranged alternatingly to form the border zone 130.

As a result of such a discontinuous pattern of the border zone 130, only the portions corresponding to the active areas 132 are displayed during operation, such that the border zone 130 is no longer enclosed.

Figure 2:
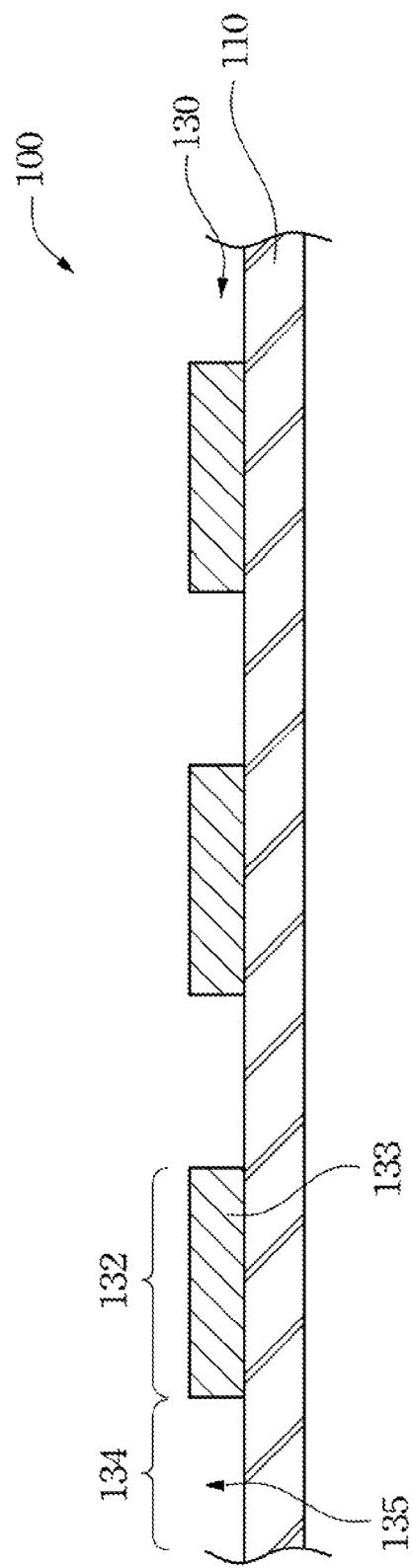
FIG. 2 is a partial cross-sectional view along line A-A of the driving substrate according to the embodiment in the invention.

FIG. 2 is a partial cross-sectional view along line A-A of the driving substrate 100 according to the embodiment in the invention. The driving substrate 100 comprises the first substrate 110 including the border zone 130 surrounding the display zone 120 (as shown in FIG. 1). The border zone 130 comprises the active areas 132, and the non-active areas 134 connected to the active areas 132. The active areas 132 comprise a first conductive layer 133, and the non-active areas 134 comprise through holes 135. As an example, the active areas 132 are formed by the first conductive layer 133, and the non-active areas 132 are formed by the through holes 135 in the first conductive layer 133, such that each of the through holes 135 is disposed between a pair of adjacent active areas 132. The first conductive layer 133 may be disposed on the first substrate 110. The through holes 135 are formed in the first conductive layer 133 using photolithography or laser drilling methods to divide the first conductive layer 133 into a plurality of sections. Therefore, the active areas 132 and the non-active areas 134 are isolated from each other and a discontinuous pattern of the border zone 130 is formed.

Figure 3:
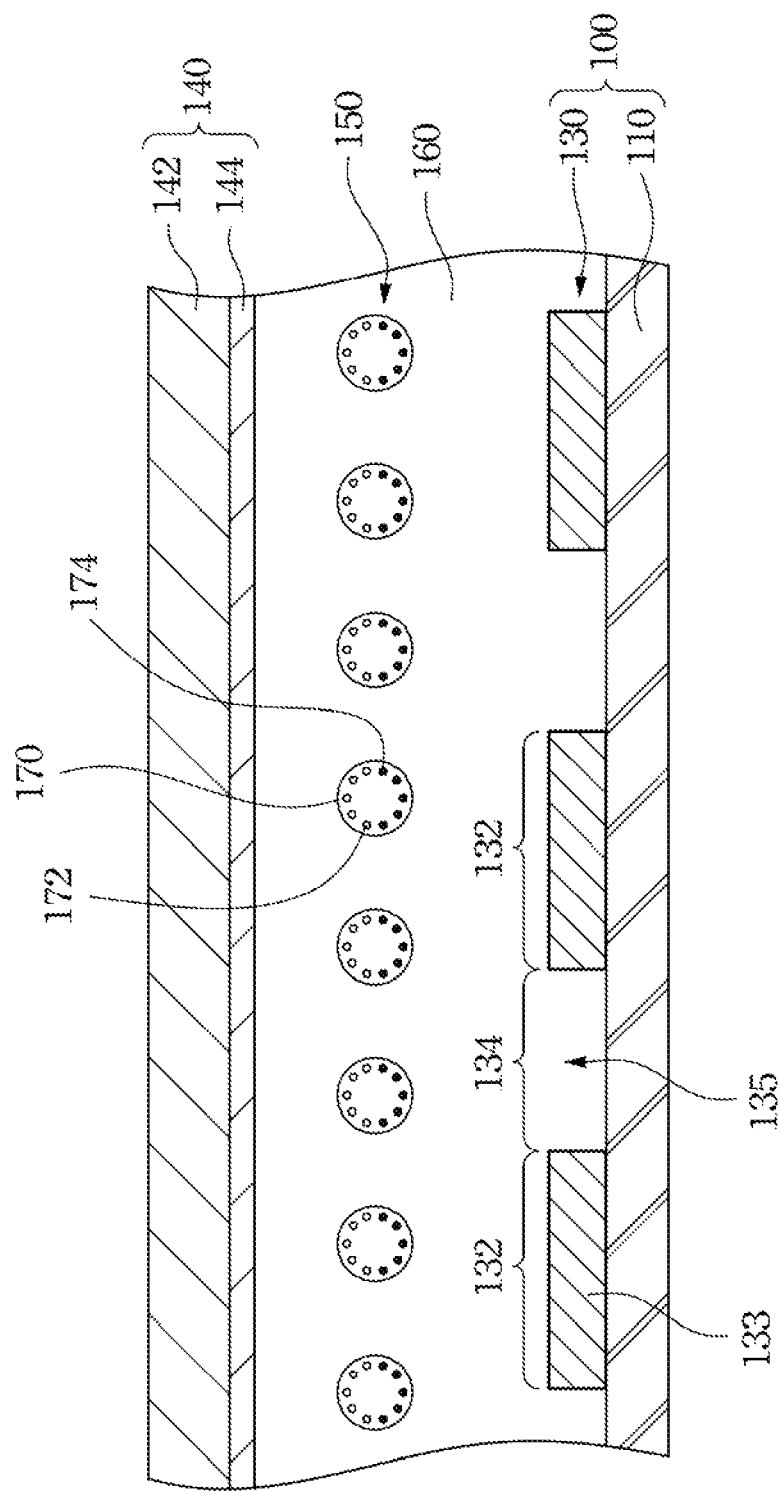
FIG. 3 is a cross-sectional view a display with the driving substrate according to the embodiment in FIG. 2.

FIG. 3 is a cross-sectional view of a display with the driving substrate 100 according to the embodiment in FIG. 2. The display comprises the driving substrate 100, a second substrate 140, and a display layer 150 disposed between the second substrate 140 and the driving substrate 100. The driving substrate 100 comprises the first substrate 110 with the border zone 130 surrounding the display zone 120 (as shown in FIG. 1). The border zone 130 comprises the active areas 132 and the non-active areas 134, which are formed respectively by the first conductive layer 133 and the through holes 135 therein, as described above.

The second substrate 140 comprises a transparent substrate 142 and a transparent conductive layer 144 disposed between the transparent substrate 142 and the display layer 150. The transparent conductive layer 144 faces the driving substrate 100. The first substrate 110 and the transparent substrate 142 may be made using glass or plastic. Each of the first conductive layer 133 and the transparent layer 144 may be made using a material that is transparent and conductive, such as Indium Tin Oxide (ITO) or Indium Zinc Oxide (IZO).

The display may be an electronic paper display for example. The display layer 150 comprises a plurality of microcapsules 170 disposed between the first substrate 110 and the second substrate 140. An adhesive, such as an optical adhesive, may be applied between the driving substrate 100 and the second substrate 140 to fix the structure of the display. The microcapsules 170 comprise white particles 172 with a first type of charge and colored particles 174 with a second type of charge, in which the polarity of the first type of charge is opposite to the polarity of the second type of charge. The first conductive layer 133 and the transparent conductive layer 144 connect to different voltage levels respectively to thereby form an electric field between the active areas 132 and the transparent layer 144 when power is supplied to the display. The electric field drives the microcapsules 170 to move, such that the color of the border zone 130 is changed. The areas of color change correspond to where the active areas 132 are distributed.

Since the border zone 130, which functions as the bottom electrode, is a discontinuous pattern composed by a plurality of active areas 132, even if the impedance of the areas of the transparent conductive layer 144 on the second substrate 140 corresponding to the active areas 132 becomes extremely high after operation for long periods, the areas of lost conductivity correspond to the active areas 132 in the discontinuous pattern. As a result, the supplied voltage is able to enter the display area through the gaps in the discontinuous pattern of the transparent conductive layer 144, such that the display area can display normally.

FIG. 4 and FIG. 5 are schematic diagrams of the driving substrate 100 and the second substrate 140 in FIG. 3, respectively. The first substrate 110 comprises the display zone 120 and the border zone 130 surrounding the display zone 120. The border zone 130 comprises a plurality of the active areas 132 and the active areas 132 are distributed uniformly on the border zone 130. A first voltage level is connected to the active areas 132. The transparent conductive layer 144 is disposed on the whole surface of the transparent substrate 142.

At least one first silver glue point 112 is located on the first substrate 110 and a second voltage level is connected to the first silver glue point 112. At least one second silver glue point 146 is located on the second substrate 140 and the second silver glue point 146 is connected to the transparent conductive layer 144. The display further comprises a silver glue 180 which is utilized for connecting the first silver glue point 112 to the second silver glue point 146, such that the transparent conductive layer 144 is connected to the second voltage level.

The connections and the materials mentioned above will not be described in detail in the following, and only the variations with respect to the driving substrate 100 will be described.

Figure 6:
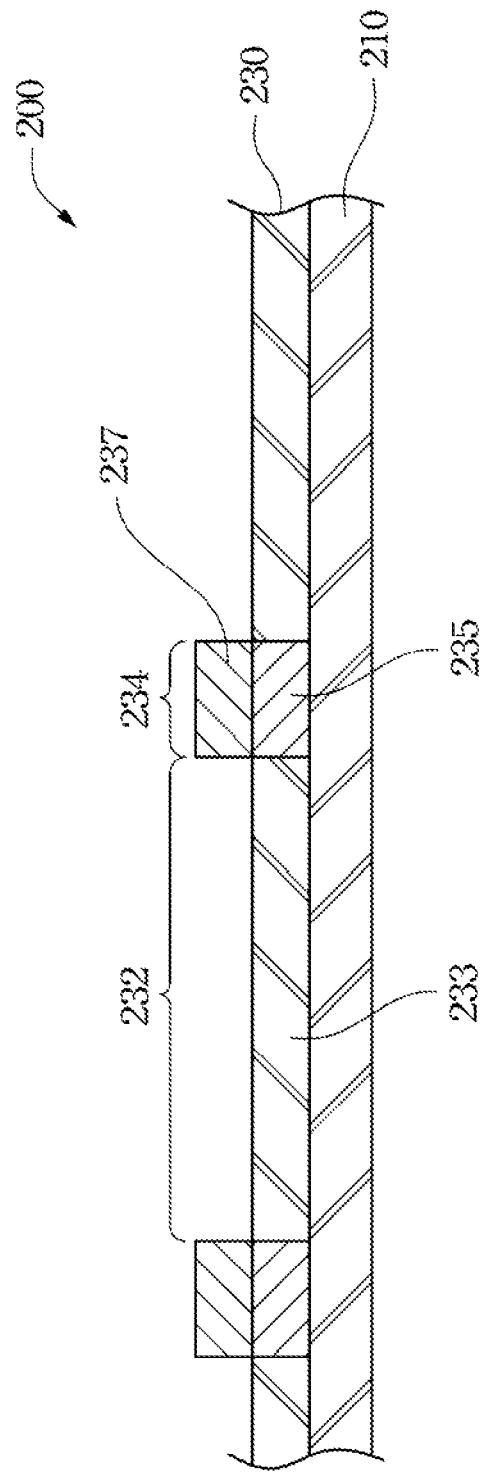
FIG. 6 is a cross-sectional view of a driving substrate according to another embodiment in the invention.

FIG. 6 is a cross-sectional view of a driving substrate 200 according to another embodiment in the invention. The driving substrate 200 comprises a first substrate 210 and a border zone 230 surrounding a display zone and disposed on the first substrate 210. The border zone 230 comprises at least one active area 232 and at least one non-active area 234 connected to the active area 232. The active area 232 comprises a first conductive layer 233, and the non-active area 234 comprises a second conductive layer 235 and a first insulating layer 237. The second conductive layer 235 is disposed on the first substrate 210 and connected to the first conductive layer 233. The first insulating layer 237 is disposed on the second conductive layer 235.

The first conductive layer 233 and the second conductive layer 235 may be fabricated using the same or different masks. The materials of the first conductive layer 233 and the materials of the second conductive layer 235 may be the same or different. More specifically and assuming a configuration where there are a plurality of the first conductive layers 233, a plurality of the second conductive layers 235, and a plurality of the first insulating layers 237, a conductive layer may be disposed on the first substrate 210 to form the first conductive layers 233 and the second conductive layers 235. Hence, the first conductive layers 233 and the second conductive layers 235 are joined together and formed using the same material. The first insulating layers 237 are then formed on the second conductive layers 235 by using a photolithography method. Alternatively, the second conductive layers 235 may be disposed in gaps between the first conductive layers 233 after the first conductive layers 233 are formed on the first substrate 210. The first insulating layers 237 are then formed on the second conductive layers 235.

Figure 7:
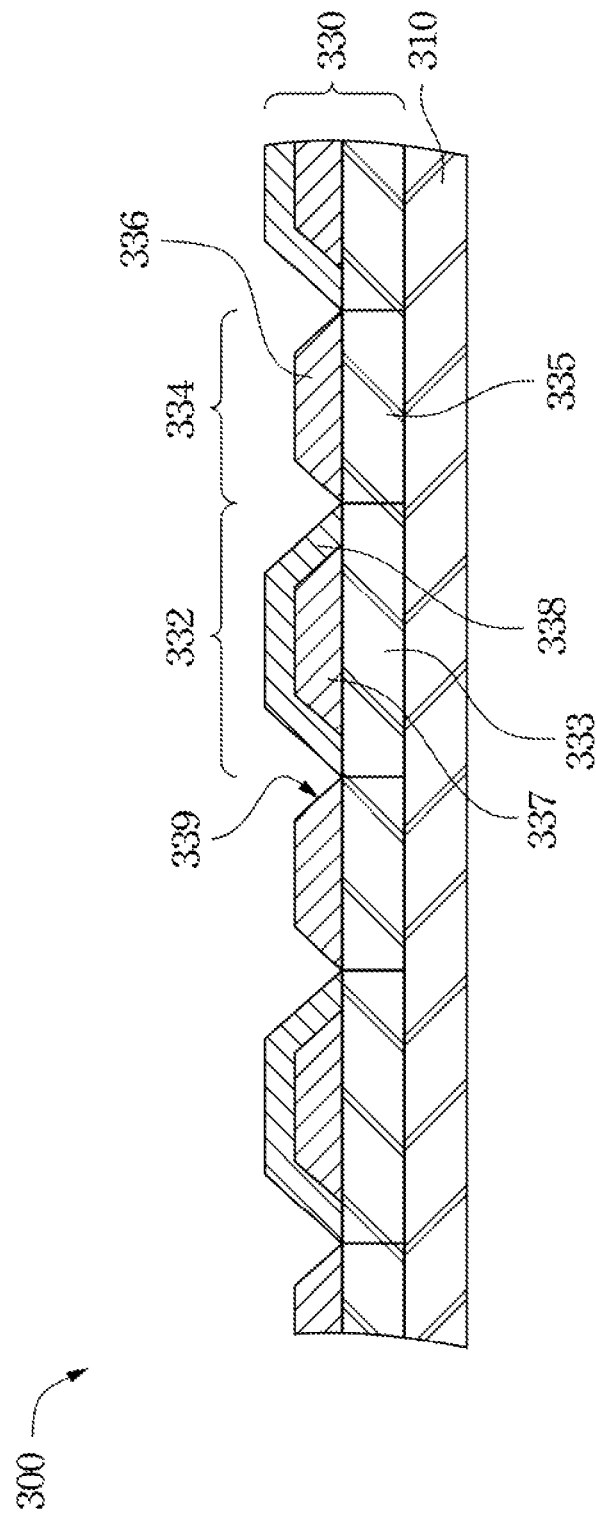
FIG. 7 is a cross-sectional view of a driving substrate according to yet another embodiment in the invention.

FIG. 7 is a cross-sectional view of a driving substrate 300 according to yet another embodiment in the invention. The driving substrate 300 comprises a first substrate 310, and a border zone 330 surrounding a display zone and disposed on the first substrate 310. The border zone 330 comprises at least one active area 332 and at least one non-active area 334 connected to the active area 332. The active area 332 comprises a first conductive layer 333, and the non-active area 334 comprises a second conductive layer 335 and a first insulating layer 336. The second conductive layer 335 is disposed on the first substrate 310 and connected to the first conductive layer 333. The first insulating layer 336 is disposed on the second conductive layer 335.

The active area 332 further comprises a second insulating layer 337 and the third conductive layer 338. The second insulating layer 337 is disposed on part of the first conductive layer 333. The third conductive layer 338 covers the second insulating layer 337 and connects to the first conductive layer 333.

The first conductive layer 333 and the second conductive layer 335 may be fabricated using the same or different masks. The first insulating layer 336 and the second insulating layer 337 may be fabricated using the same or different masks. The materials of the first conductive layer 333, the second conductive layer 335 and the third conductive layer 338 may be the same or different. More specifically and assuming a configuration where there are a plurality of each of the first conductive layers 333, the second conductive layers 335, the first insulating layers 336, the second insulating layers 337, and the third conductive layers 338, a conductive layer may be disposed on the first substrate 310 to form the first conductive layers 333 and the second conductive layers 335. Hence, the first and second conductive layers 333, 335 are joined together and formed using the same material. An insulating layer is then formed on the conductive layer. The first insulating layers 336 and the second insulating layers 337 may be disposed in a manner such that a plurality of gaps 339 are formed on the insulating layer, wherein the gaps 339 are on the first conductive layers 333. Finally, the third conductive layers 338 are formed on the second insulating layers 337 and connect to the first conductive layers 333 through the gaps 339

The design in this embodiment ensures that an electric current flows smoothly into the part of the second substrate corresponding to the transparent conductive layer of the display zone so as to realize normal display in the display zone. Moreover, since the third conductive layers 338 connect to the first conductive layers 333 respectively, even if the impedances of one or many of the third conductive layers 338 are extremely high as a result of an oxidation-reduction reaction after operation for a long period to thereby impede the flow of electric current, the voltage still may be delivered to the third conductive layers 338 via the first conductive layers 333 and the second conductive layers 335 for normal display.

FIG. 8 to FIG. 13 are schematic diagrams of active area 420 and non-active area 430 distributions of a driving substrate 400 according to different embodiments in the invention. In some embodiments, there may be a plurality of each of the active areas 420 and the non-active areas 430. As an example, the active areas 420 may be distributed on two of the short or long borders of the display zone 412 on the first substrate 410 and the non-active areas 430 are connected to the active areas 420, as shown in FIGS. 8 and 9. In another example, the active areas 420 may be distributed in segments on two opposite borders of the display zone 412' on the first substrate 410 and the non-active areas 430 are connected to the active areas 420, as shown in FIG. 10. In yet another example, the active areas 420 may be disposed at the corners of the display zone 412 on the first substrate 410 and the non-active areas 430 are connected to the active areas 420, as shown in FIG. 11. According to another example, the active areas 420 may be distributed uniformly on the borders and the corners of the display zone 412 on the first substrate 410 and the non-active areas 430 are connected to the active areas 420, as shown in FIG. 12. In some embodiments, there may be one of each of the active area 420 and the non-active area 430. In one example, the active area 420 on the first substrate 410 is disposed to surround to the display zone 412 in a C-shaped configuration and the non-active area 430 is connected to the active area 420, as shown in FIG. 13.

The distribution of the active areas 420 and the non-active areas 430 is not limited to any particular embodiment mentioned above. Moreover, the length of each of the active areas 420 may be the same or different as long as the pattern of the border zone is discontinuous.

Due to the discontinuous pattern the active areas used as the bottom electrode, even if the areas of the top electrode corresponding to the active areas becomes insulating areas due to the extremely high impedance after operation for a long period, the display area still displays normally since the voltage may be delivered to the display area via the gaps between the insulating areas.

It will be apparent to those skilled in the art that various a modifications and variations can be made to the structure of the present invention without departing from the scope or spirit of the invention. In view of the foregoing, it is intended that the present invention cover modifications and variations of the invention provided they fall within the scope of the following claims.

What is claimed is:

1. A driving substrate, comprising:
   a first substrate comprising a display zone and a border zone surrounding the display zone, wherein the border zone comprises:
   at least one active area comprising a first conductive layer and disposed on the first substrate; and
   at least one non-active area connecting to the least one active area for forming the border zone, wherein the least one non-active area comprises a second conductive layer and a first insulating layer, and the second conductive layer is disposed on the first substrate and connected to the first conductive layer, and the first insulating layer is disposed on the second conductive layer.

2. The driving substrate of claim 1, wherein the least one active area further comprises a second insulating layer and a third conductive layer, the second insulating layer is disposed on a part of the first conductive layer, and the third conductive layer covers the second insulating layer and is connected to the first conductive layer.

3. The driving substrate of claim , wherein the number of the least one active layer and the least one non-active layer is single.

4. The driving substrate of claim wherein the number of the least one active layer and the least one non-active layer is plural.

5. The driving substrate of claim 4, wherein the active areas and the non-active areas are arranged alternatingly.

6. A display, comprising:
   the driving substrate of claim 1;
   a second substrate; and
   a display layer disposed between the driving substrate and the second substrate.

7. The display of claim 6, wherein the second substrate comprises a transparent substrate and a transparent conductive layer disposed between the transparent substrate and the display layer.

8. The display of claim 6, wherein the least one active area further comprises a second insulating layer and a third conductive layer, the second insulating layer is disposed on a part of the first conductive layer, and the third conductive layer covers the second insulating layer and is connected to the first conductive layer.

9. The display of claim 6, wherein the number of the least one active layer and the least one non-active layer is single.

10. The display of claim 6, wherein the number of the least one active layer and the least one non-active layer is plural.

11. The display of claim 10, wherein the active areas and the non-active areas are arranged alternatingly.

\* \* \* \* \*